Patented Apr. 8, 1941

2,237,768

UNITED STATES PATENT OFFICE 2,237,768

PRODUCTION OF AZO COLORS

John Vincent Scudi, New York, N. Y., assignor to E. I. du Pont de Nemours & Company, Wilmington, Del., a corporation of Delaware No Drawing. Application July 28, 1937, Serial No. 156,139

15 Claims. (Cl. 260—195)

This invention relates to the production of azo dye pigments, and more particularly to an improved method for producing the same.

In azo pigment manufacture, the use of mixtures of intermediates to modify the properties of the resulting pigment has been recently proposed. Thus, in the production of the so-called dark Para Red, small amounts of Mono Acid F (2-naphthol-7-sulfonic acid) are added to the beta naphthol and simultaneous coupling of the mixture with para nitraniline effected. Likewise, in Lithol Reds, the pigment of which is usually an alkaline earth salt of the dye formed by coupling diazotized Tobias acid (2-naphthylamine-1-sulfonic acid) with beta naphthol, the use of small amounts of phenylmethylpyrazolone associated with the beta naphthol has been proposed. In a like manner, certain amines have been proposed as modifying agents in the Tobias acid used in lithol reds.

In all cases, however, it has been considered essential that both the principal intermediates (a term applied by me to the main components of the coupling which make up the principal dye or pigment) and the accessory intermediates (the term I apply to those intermediates added to either principal intermediate and present in minor amounts, say, up to 25% on the basis of the component for which substituted and therefore, in a sense, impurities in the principal coupling components) shall be coupled simultaneously or in the presence of each other.

I have now discovered that greatly improved pigments are produced when the azo dye coupling formed by the reaction of the accessory intermediate is prepared separately and added to a component of the principal coupling as a completely formed dye (denominated herein the "accessory dye") and that the resultant products will exhibit marked and generally improved pigmentary properties, as well as increased color, beauty value, tinctorial strength, greater depth of the full shades, and cleanliness of tint.

Accordingly, it is among the objects of my invention to provide a new method of producing azo pigments of enhanced properties.

It is a further object of my invention to provide a more flexible method of using accessory intermediates.

It is a still further object of this invention to provide a method of using accessory intermediates which will allow an exact control over the amount of the intermediate which enters into the final coupled product.

It is a still further object of my invention to provide a method of using intermediates accessory to both the first and second components in any given coupling, without the formation of undesirable by-products.

Other objects and advantages of the invention will be apparent as the ensuing description proceeds.

These objects and advantages are obtainable in my invention, which broadly comprises separately preparing the accessory azo dyes employed as modifying agents and adding the dyes thus separately prepared to either component of the reaction mixture, prior to the coupling.

In adapting my invention to practice I may employ a great variety of accessory azo dyes and an equally great variety of principal azo dyes. The amount of accessory dye utilizable in the invention is subject to wide variance, but in the production of optimum benefits, I preferably employ an amount of accessory dye equal to about 5–8% of the principal pigment. Likewise, accessory dyes which have one or the other component in common with the principal coupling may be employed, or an accessory dye in which both components are foreign to the principal coupling may be utilized. Similarly, I may use one accessory dye or may use two or more accessory dyes. I may also prepare my accessory dye by the same coupling procedure as that of the principal coupling or I may use any other procedure adapted to produce a dye with more advantageous properties.

In adapting my invention to practice, I preferably first prepare the accessory dye from any desired combination of coupling components, employing an amount thereof (usually from 5–8%) in the form of a water solution or slurry, if insoluble or slightly soluble. This solution I mix with a solution or water suspension of either component of the principal coupling, preferably, however, with the second component. The main components and then permitted to react in the usual and conventional manner of effecting azo couplings. Subsequent treatment of the coupled dye to effect a finished pigment product will depend upon its nature. For example, the coupled dye need only be stirred for a given time or developed at an elevated temperature and stirred, or reacted with a metallic salt with or without subsequent development at elevated temperatures. Accordingly, by the term "development" I have reference to that well-known practice in the art of manufacturing azo pigments or lakes which consists essentially in stirring or digesting through heating or boiling of the color after its various components have been incorporated with each other to produce a change in the physical and chemical properties of the azo compound, whereby completion of the reactions of formation of the pigment and obtainment of the full tinctorial value of the pigment is had.

In order that the invention may be more clearly understood, the following examples, in which the parts are by weight, are given, each of which is illustrative in character only and in no wise in limitation of the invention:

EXAMPLE I.—*Para Red (Color Index No. 44)*

138 parts of para nitraniline are dissolved by heating in a solution of 164 parts of hydrochloric acid (100%) in 1350 parts of water. The clear solution is diazotized in the usual manner with 72 parts of sodium nitrite (100%) and the excess of nitrous acid removed by stirring with 25 parts of urea.

In a separate container 150 parts of beta naphthol are dissolved in a warm solution of 105 parts of caustic soda in 1200 parts of water. 30 parts of Turkey Red Oil dissolved in 200 parts of water are added and the volume adjusted to 5000 parts at a temperature of 15° C.

Coupling is effected by rapidly mixing the beta naphthol solution and the diazo solution followed after a period of stirring with 250 parts of dry bicarbonate of soda. After further stirring the suspension is filtered, washed and dried.

The resulting pigment (about 300 parts) is a typical yellow shade Para Red.

The dye pigment obtained in accordance with said Example I may be modified, if desired, as follows:

(a) By substituting for the beta naphthol employed in said example, 230 parts of Mono-Acid F (2 naphthol-7 sulfonic acid), a much darker and bluer dye is obtained which is appreciably soluble in water but non-adapted to pigment use. If an aqueous suspension containing 20 parts of the dye so obtained, however, is added to the beta naphthol solution prior to the coupling of the Para Red of said Example I, the resulting pigment will be much darker and bluer than the original.

(b) Similarly, if coupling is carried out as in Example I, but meta nitraniline and Mono-Acid F are employed in lieu of equivalent amounts of para nitraniline and beta naphthol, respectively, a somewhat dull orange colored dye precipitate will result, but unadapted for pigment use. However, if 20 parts of this orange precipitate in the form of an aqueous suspension are added to the beta naphthol solution of Example I prior to the coupling, the resultant pigments, after coupling with diazotized para nitraniline, will be very much darker, brighter and of a bluer shade of red than the product of said Example I.

Similarly, if the para nitraniline is diazotized as in Example I and coupled with phenylmethylpyrazolone, the resulting yellowish azo dye may be added to the coupling of said Example I, either alone or, preferably, in combination with the dye obtained by procedure (a) above—employing about 3% on the basis of the principal coupling with 5% of said dye. In this latter instance, the color will be brighter than when the method of (a) only is employed.

EXAMPLE II.—*Lithol Red (Color Index No. 189)*

223 parts of Tobias acid (2 naphthylamine-1 sulfonic acid) are dissolved in a dilute solution of 43 parts of caustic soda, and diazotized in the usual manner with 74 parts of sodium nitrite and 90 parts of hydrochloric acid (100%) at 0°–2° C. In another container 150 parts of beta naphthol are dissolved in a solution of 45 parts of caustic soda in 1000 parts of water and the solution diluted to 5500 parts at 0° C. To it are added in turn 45 parts of para soap dissolved in 500 parts of water and 65 parts of acetic acid (100%) in 500 parts of water. After stirring the substantially neutral suspension of beta naphthol, the diazo is added quickly and the coupling effected by adding 60 parts of caustic soda dissolved in 1500 parts of water.

The barium salt is prepared by adding 200 parts of barium chloride dissolved in 2000 parts of water and developing the pigment at about 60° C. for 10 to 15 minutes. The resulting Lithol Red pigment may be used for many purposes.

Modification of the pigment of Example II to obtain a product of the present invention may be suitably effected by the following procedures:

(a) 223 parts of Tobias acid are diazotized as above, 177 parts of phenylmethylpyrazolone are dissolved in a solution of 95 parts of caustic soda in 1000 parts of water and the solution adjusted to 5500 parts at 0° C. To this are added in turn 12 parts of para soap in 250 parts of water and 93 parts of sodium acetate in 250 parts of water. Coupling is brought about by adding the diazo over a period of 15 minutes and stirring for an additional 15 minutes. The resulting yellow precipitate may be transformed to the barium salt but has slight value as a pigment. If, however, an amount of the aqueous suspension containing about 22 parts of the yellow dye is added to the beta naphthol suspension obtained in the first part of this Example II, and the coupling, strike and development carried out in the usual manner, the resulting pigment will be darker, stronger, cleaner and more bronzy.

(b) 303 parts of "C" acid (2 naphthylamine-4:8 disulfonic acid) and 150 parts of beta naphthol are substituted for the Tobias acid and phenylmethylpyrazolone, respectively, of (a) above, and the resulting product is a bright, bluish red, soluble dye. When used alone it does not precipitate completely with either barium or calcium, but when about 5% is added to the beta naphthol of the first part of this Example II or similar Lithol couplings, and the resulting product converted to the calcium salt, a dark bronzy calcium Lithol results which is about 20% stronger than a similar product not containing the accessory dye.

(c) Similarly the dye ortho-naphthionic acid (1 naphthylamine-2-sulfonic acid)→beta naphthol added as in (b) to a calcium Lithol gives a very dark, blue product.

(d) The dye para nitraniline→Schaeffers acid (2-naphthol-6-sulfonic acid) added to the coupling of the first part of this Example II gives a darker and brighter barium Lithol.

(e) The dye para nitraniline→Mono-Acid F added to a coupling as in the first part of Example II gives a very dark, strong and blue calcium Lithol.

EXAMPLE III.—*Lake Bordeaux B (Color Index No. 190)*

223 parts of Tobias acid (2-naphthylamine-1-sulfonic acid) are dissolved in a dilute solution of 43 parts of caustic soda and diazotized in the usual manner with 74 parts of sodium nitrite and 90 parts of hydrochloric acid (100%) at 0°–2° C. In another container 196 parts of beta-oxy-naphthoic acid (2-hydroxy-3-naphthoic acid) are dissolved in a dilute solution of 160 parts of caustic soda. The volume is made to 5000 parts at 20° C. and 60 parts of Turkey Red Oil are added. Coupling is effected by adding the diazo over a period of 30 minutes. After coupling the volume is increased to 97,000 parts and the mixture partially acidified with 85 parts of hydrochloric acid (100%). It is converted to the calcium salt by adding a 5% solution of 220 parts of calcium chloride, then made alkaline with a dilute solution of 162 parts of caustic soda. Finally the pigment is developed at the boil for 30 minutes. The resulting pigment (430 parts) is a maroon shade but dull and of little commercial value.

(a) If 223 parts of Broenner's acid (2-naphthyl-amine-6-sulfonic acid) is substituted for the Tobias acid in said Example III, the resulting dye can be converted to the calcium salt but the pigment is not commercially valuable. However, if an amount of the aqueous suspension of the dye equivalent to about 22 parts of the dry dye is added to the solution of the beta-oxy-naphthoic acid in the above principal coupling and the remainder of the process carried out as above, the resulting pigment is much darker, brighter, bluer and stronger and is an eminently satisfactory commercial maroon pigment.

(b) If ortho-naphthionic acid (1-naphthyl-amine-2-sulfonic acid) is substituted for the Broenner's acid in the next preceding paragraph (a) and the resulting dye added to the beta-oxy-naphthoic acid solution in the principal coupling, the resulting pigment will be greatly improved in depth and strength.

In addition to the foregoing detailed examples, the following includes examples of some of the other specific types of azo pigments obtainable in the invention, said pigments being adapted to desired modification by use of the variously named accessory dyes. These examples are in abbreviated or skeleton form, but obtainment of the involved azo pigments will be readily understandable to those skilled in the art and particularly from what has been set out hereinabove.

EXAMPLE IV.—*Toluidine Red (Color Index No. 69)*

Principal coupling—
    Meta-nitro-para-toluidine→beta naphthol

Accessory couplings—
    Meta-nitro-para-toluidine→phenyl - methyl-pyrazolone—brighter and stronger
    Meta-nitro-para-toluidine→Armstrong's acid (2-naphthol-1-sulfonic acid)—darker and stronger EXAMPLE V.—*Lake Red C (Color Index No. 165)*

Principal coupling—
    2 chlor 5 toluidine-4-sulfonic acid→beta naphthol used as the barium salt Accessory couplings—
    2-chlor-5-toluidine-4-sulfonic acid→phenyl methyl pyrazolone—dark, yellow and strong
    2 - chlor-4-toluidine - 5 - sulfonic acid→beta naphthol—dark, strong and yellow EXAMPLE VI.—*Lithol Rubine B (Color Index No. 163)*

Principal coupling—
    4-toluidine-3-sulfonic acid→beta-oxy-naphthoic acid used as the calcium salt Accessory coupling—
    4-toluidine-2-sulfonic acid→beta-oxy-naphthoic acid—darker and bluer EXAMPLE VII.—*Hansa Yellow 10G*

Principal coupling—
    4-chlor - 2 - nitraniline→aceto - acet-ortho-chlor-anilide Accessory coupling—
    ortho-nitraniline→aceto-acet - ortho-chlor - anilide—lighter, greener and stronger

EXAMPLE VIII

Principal coupling—
    2-chlor - 4-toluidine - 5-sulfonic acid→beta-oxy-naphthoic acid used as the calcium salt Accessory couplings—
    4-toluidine-2-sulfonic acid→beta-oxy-naphthoic acid—darker and stronger
    2 - chlor- 4 -toluidine→beta-oxy - naphthoic acid—darker and stronger The foregoing examples are illustrative of the wide range of principal couplings utilizable in the invention and represent particular azo combinations especially useful in the manufacture of pigments. The "accessory dyes" employed therein represent those which I have found to be particularly advantageous and useful in pigment production. Generally, however, I have found that all azo dyes will function as "accessory dyes" with other couplings, inasmuch as the products of the resulting couplings have properties which are not predictable on the basis of the known properties of the separate pure dyes. Obviously, the choice of dye combinations to be employed and to give desired effects will be apparent to those skilled in the art.

As will be seen from said examples, the use of an amount of accessory dye or dyes ranging from substantially 5-8% has been resorted to. Such range, however, merely represents preferred amounts useful in procuring optimum benefits under the examples cited. Obviously, the amounts utilizable are subject to wide variation. In general, of course, it will be found that when lesser amounts are employed decreased effects will result. Likewise, the use of larger amounts is contemplated and will be dependent upon the ultimate effects desired. However, when amounts greater than, say, 25% of the accessory dye or dyes are used, the tinctorial effects of such accessory dye or dyes may be found to predominate over the effect on the principal couplings contemplated in the invention.

Likewise, while the foregoing examples illustrate the use of accessory dyes present during the coupling, I have found that in some instances it is not essential to have the accessory dyes present during the reaction of the principal coupling, and that when said accessory dye is added substantially immediately subsequent to the completion of this reaction (i. e., within, say, five or six hours, and not to exceed substantially twenty-four hours), substantially the same results will be found to obtain. Similarly, I also contemplate adding the accessory dye just prior to isolation of the principal azo dye, that is, prior to separation of the azo dye from the reaction mixture or prior to formation of the metallic salt.

The exact means by which the "accessory dye" exerts such a remarkable effect on the principal coupling is not completely understood by me. It appears, however, that the unexpected results which I obtain in my invention arise by reason of the combination of two or more distinct chemical individuals in a single crystal, so that all are contained within the lattice of the crystal in a new, indistinguishable combination. This is evidenced by the unexpected color changes and effects which result from the practice of my invention, and obviously is not a result which arises from mere mixing of the various components. This behavior of the complex organic molecules with which the present invention is concerned is similar to a certain extent to the phenomenon of mixed crystals in inorganic compounds, wherein, for instance, three compounds, two of which as single crystals are white, and the third is yellow, form mixed crystals which are a bright orange. The color changes resulting from a practice of my invention are equally unexpected and the conclusion appears warranted that mixed crystals or solid solutions of these organic azo dyes results.

The products obtainable in accordance with my invention will find useful application in those very places where azo pigments are employed. Lithol Reds treated with certain accessory dyes are eminently useful in the printing ink industry because of the clean bronzy printing tone of the pigments when ground in the lithographic varnish to make printing inks. In paints they are especially useful because of the dark bright appearance in full shade. The Lake Bordeaux B Maroon dye obtainable in Example III is somewhat valueless when in pure form. However, the use of the accessory dyes enables the manufacture of pigments which are of eminent value in automotive lacquers. The dark shade Para Red depends upon the use of Mono-Acid F as an accessory intermediate. The use of the corresponding separately prepared dye, as in modification (a) of Example I, or of the completely foreign dye meta nitraniline→Mono-Acid F, as in modification (b) of Example I, makes possible a more accurate control of the reaction.

By the utilization of the separately prepared "accessory intermediates," in accordance with my invention, it will be found that many useful advantages will result. Among others, it will be found that enhanced beauty, greater depth of full shades, greater strength and cleanliness of tint and generally improved properties as pigments result. Furthermore, my invention affords a novel means for controlling the various reactions involved. It enables the use of the best possible conditions for coupling the accessory dyes, which are not necessarily the same as those found most desirable for coupling the principal dyes. For instance, I have found that the optimum conditions for coupling diazotized Tobias acid with phenyl-methylpyrazolone are quite different from those for coupling diazotized Tobias acid with beta naphthol.

An even greater advantage results when the accessory dye is composed of two intermediates which are both foreign to the principal coupling. If mixtures of intermediates are used, a series of competitive reactions result and duplicable products are very difficult to attain. If, by the way of illustration, the principal coupling is A→B and the desired accessory coupling is X→Y, the use of mixtures of intermediates, A+X to couple with B+Y, will result not only in A→B and X→Y but also in varying amounts of A→Y and X→B. Very slight changes in conditions may well have a large effect on the relative amounts of these reactions. It is therefore quite apparent that the control of such a series of reactions is difficult whereas the method of my invention, in which the dye X→Y would be prepared in a separate step and added after it is completely formed to, say B, before the addition of A, allows careful control. This method permits the preparation of X→Y under optimum conditions and it effectively prevents the formation of A→Y and X→B. If these last are desired, they can also be prepared separately and added in definitely controlled amounts.

When, as occasionally happens, it is desired to introduce a second accessory dye, the use of mixtures of intermediates results in a situation still more complex than that noted above and only by following the method of my invention, viz., the use of separately prepared dyes, is any reasonable control of the various reactions possible.

I claim as my invention:

1. In a process for producing an azo dye pigment as a separate substance wherein a diazo compound is directly reacted with a coupling component in the principal coupling reaction, the step which comprises adding a separately prepared azo dye to the principal coupling reaction mixture at a time not later than substantially immediately subsequent to completion of said principal coupling reaction.

2. In a process of manufacturing an azo dye pigment as a separate substance wherein a diazo compound is reacted with a coupling component in the principal coupling reaction, the step of separately preparing and adding an azo dye to a component of the principal coupling prior to completion of said principal coupling reaction.

3. In a process for the production of an azo dye pigment as a separate substance wherein a diazo compound is directly reacted with a coupling component in the principal coupling reaction, the step of adding to the principal coupling reaction mixture a separately prepared azo dye immediately subsequent to completion of said principal coupling reaction, but prior to the development of the pigment.

4. In a process for producing an azo dye pigment as a separate substance wherein a diazo compound is directly reacted with a coupling component in the principal coupling reaction, the step which comprises reacting a principal coupling component of the azo dye with an accessory intermediate to obtain a preformed accessory azo dye, and adding the resultant preformed dye to the principal coupling reaction mixture prior to development of the pigment.

5. The process of claim 1 in which more than one separately prepared azo dye is added to the principal coupling reaction mixture.

6. In a process for producing an azo dye pigment as a separate substance wherein as the main coupling reaction a diazo compound is directly reacted with a coupling component, the improvement which comprises separately reacting a principal coupling intermediate of the azo dye with an accessory intermediate to obtain a preformed azo dye, and prior to completion of said main coupling reaction, adding said preformed dye to a principal intermediate of said main coupling reaction.

7. In a method for producing an azo dye pigment as a separate substance wherein diazotized Tobias acid is reacted with beta naphthol in the principal coupling reaction, the improvement which comprises separately reacting Tobias acid with an accessory intermediate to obtain a preformed azo dye and thence adding the resultant preformed dye to the main coupling reaction mixture containing beta naphthol.

8. The process of claim 7 in which the accessory intermediate comprises phenyl-methyl-pyrazolone.

9. In a method for producing an azo dye pigment as a separate substance wherein diazotized para-nitraniline is reacted with beta naphthol in the principal coupling reaction, the improvement which comprises separately reacting diazotized para-nitraniline with an accessory intermediate to obtain a preformed azo dye, and adding said preformed dye to the main coupling reaction mixture containing beta naphthol.

10. The process of claim 9 in which the accessory intermediate comprises 2-naphthol-7-sulfonic acid.

11. In a method for producing an azo dye pigment as a separate substance wherein diazotized Tobias acid is reacted with beta-oxy-naphthoic acid in the principal coupling reaction, the improvement which comprises adding to the diazotized Tobias acid a preformed dye comprising the separately prepared reaction product of beta-oxy-naphthoic acid with a diazotized accessory intermediate.

12. The process of claim 11 in which the accessory intermediate comprises 2-naphthylamine-6-sulfonic acid.

13. A process for producing an improved azo pigment as an independent product, comprising reacting a diazo compound with a coupling component in the principal coupling reaction and effecting said principal coupling in the presence of a minor amount of an added, separately prepared, and completely formed accessory azo dye.

14. A process for producing an improved azo pigment as an independent product, comprising reacting a diazo compound with a coupling component in the principal coupling reaction and effecting said principal coupling in the presence of from about 5-8% of an added, separately prepared, and completely formed accessory azo dye.

15. A process for producing an improved azo pigment as an independent product, comprising reacting in the principal coupling reaction an azo compound with a coupling component, and effecting said principal coupling in the presence of a minor amount of a plurality of separately prepared, completely formed accessory azo dyes.

JOHN VINCENT SCUDI.